United States Patent
Schneider et al.

(10) Patent No.: US 10,814,775 B2
(45) Date of Patent: Oct. 27, 2020

(54) METHOD FOR CALIBRATING AN ELECTROMAGNETIC RADIATION-EMITTING DEVICE USING A SENSOR UNIT

(71) Applicant: Dr. Ing. h.c. F. Porsche Aktiengesellschaft, Stuttgart (DE)

(72) Inventors: Christian Schneider, Tuebingen (DE); Sebastian Soehner, Karlsruhe (DE); Constantin Haas, Pulheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/449,485

(22) Filed: Jun. 24, 2019

(65) Prior Publication Data

US 2019/0389365 A1 Dec. 26, 2019

(30) Foreign Application Priority Data

Jun. 26, 2018 (DE) .......................... 10 2018 115 334

(51) Int. Cl.
*B60Q 1/00* (2006.01)
*F21S 41/60* (2018.01)
(Continued)

(52) U.S. Cl.
CPC ............ *B60Q 1/0023* (2013.01); *B60Q 1/08* (2013.01); *F21S 41/60* (2018.01); *G01B 11/026* (2013.01);
(Continued)

(58) Field of Classification Search
None
See application file for complete search history.

(56) References Cited

U.S. PATENT DOCUMENTS

2018/0356213 A1* 12/2018 Zheng .................. G06K 9/4604
2018/0357782 A1* 12/2018 Nomura .................... G06T 7/70
(Continued)

FOREIGN PATENT DOCUMENTS

| DE | 19604977 A1 | 8/1997 |
| DE | 102015122172 A1 | 6/2017 |
| DE | 102018101014 B3 | 2/2019 |

OTHER PUBLICATIONS

Gao, et al., "Flexible Method for Structured Light System Calibration," *Optical Engineering* 47, 8 (Aug. 1, 2008): 1-10.
(Continued)

*Primary Examiner* — Elmito Breval
(74) *Attorney, Agent, or Firm* — Leydig, Voit & Mayer, Ltd.

(57) ABSTRACT

A method for calibrating an electromagnetic radiation-emitting device configured to emit electromagnetic radiation using a sensor configured to detect electromagnetic radiation emitted by the electromagnetic radiation-emitting device includes projecting a pattern onto a projection surface by way of the emitted electromagnetic radiation, acquiring an image of the projection of the pattern using the sensor, and calculating at least one trajectory in an image plane of the sensor that describes a propagation of the emitted electromagnetic radiation based on a position of a characteristic feature of the pattern in the image and on a further item of information. The method further includes calculating a specific feature along an associated trajectory and calculating an incorrect position of the device by evaluating a geometric correspondence relationship between points in a world coordinate system and their image points in the image plane of the sensor.

10 Claims, 5 Drawing Sheets

(51) Int. Cl.
*B60Q 1/08* (2006.01)
*G01B 11/02* (2006.01)
*G01S 17/48* (2006.01)
*F21S 41/141* (2018.01)

(52) U.S. Cl.
CPC .......... *G01S 17/48* (2013.01); *B60Q 2200/38* (2013.01); *F21S 41/141* (2018.01)

(56) References Cited

U.S. PATENT DOCUMENTS

2018/0365524 A1* 12/2018 Kajiwara ........... G06K 9/00791
2019/0122388 A1* 4/2019 Li ............................. G06T 7/80

OTHER PUBLICATIONS

Zhang, "A Flexible New Technique for Camera Calibration," *Transactions on Pattern Analysis and Machine Intelligence* 22, 11 (Nov. 1, 2000): 1330-1334.

Lin, et al., "A Robust Epipolar Rectification Method of Stereo Pairs," 2010 International Conference on Measuring Technology and Mechatronic Automation (Dec. 2010): 322-326.

Anwar, et al., "Projector Calibration for 3D Scanning Using Virtual Target Images," *International Journal of Precision Engineering and Manufacturing* 13, 1 (Jan. 2012): 125-131.

* cited by examiner

METHOD FOR CALIBRATING AN ELECTROMAGNETIC RADIATION-EMITTING DEVICE USING A SENSOR UNIT

CROSS REFERENCE TO RELATED APPLICATIONS

This application claims benefit to German Patent Application No. DE 10 2018 115 334.1, filed Jun. 26, 2018, which is hereby incorporated by reference herein.

FIELD

The present invention relates to a method for calibrating an electromagnetic radiation-emitting device using a sensor unit. The invention relates in particular to a method for calibrating a headlight of a vehicle using a corresponding sensor unit that is installed in the vehicle.

BACKGROUND

To implement active triangulation, for example in a vehicle, in order to determine distances between the vehicle and an object on the basis thereof, it is vital to calibrate both components of the stereo system that is used. In a vehicle, the components are usually the headlight of the vehicle and the driver assistance camera (hereinafter referred to as vehicle camera) installed in the vehicle. For the calibration that is required, as things currently stand, suitable methods are initially performed for example during the manufacture of the vehicle, for a fixed geometry between the headlight and the vehicle camera. As a result, it is possible to determine the spatial relationships between the emission angles of individual light-emitting segments of the headlight, for example of LEDs of a matrix LED headlight, in relation to the vehicle camera or to the vehicle. The geometry on which the initial calibration is based may however be changed during subsequent operation of the vehicle. The alignment of the headlight may thus be changed by way of adjusting screws in the engine compartment about a horizontal and about a vertical axis, for example. Such subsequent changing of the alignment of the headlight, and thus of the geometry of the stereo components, would lead to incorrect or obsolete initial calibration results. Therefore, triangulation based on the stereo system and, at the same time, the distance values (depth values) determined thereby would be impacted by errors, and the vehicle would no longer have an effective 3D sensor system. This results in a need for online calibration, that is to say calibration able to be performed during operation of the vehicle, allowing verification of the validity of the initial calibration results and possibly recalibration during operation of the vehicle.

One method for performing dynamic calibration in the vehicle may be carried out by way of active triangulation. In this case, points detected in a light pattern by way of the vehicle camera and assigned to those segments of the headlight that are producing them are utilized so as to determine the incorrect position of the headlight on the basis of active triangulation. For this purpose, however, the initial mounting position of the headlight in the motor vehicle according to CAD construction data is used, which mounting position may be impacted by errors on account of installation positions, component tolerances, etc. Moreover, in this approach, a constant width of the segments of the matrix LED headlight is assumed, these segments also being referred to as pixels. On account of production tolerances in headlight manufacture, the assumed pixel width may likewise be impacted by errors. Providing associated image points requires light projections that contain characteristic features. However, such light projections are not able to be implemented in any desired driving scenario (town lighting/full beam, etc.) due to legal requirements (ECE regulations).

According to another method for performing dynamic calibration in the vehicle, the incorrect position of the headlight can result from the determination of an offset of characteristic points in a light pattern in comparison with corresponding initial characteristic points in the image from the vehicle camera. The incorrect position of the headlight may likewise result from the determination of a rotation of trajectories of the characteristic points in comparison with corresponding initial trajectories. In this case, a trajectory describes a path in the image from the vehicle camera on which a characteristic point of a light pattern moves depending on the distance between the vehicle or the vehicle camera and the projection surface for the light pattern. In this approach, a uniform focal point is defined for the light beams emanating from the segments of the headlight, and the trajectories (initial trajectories) determined in the context of the initial calibration are taken into consideration. By generating new image points that correspond to characteristic points in the projected light pattern, which are extracted therefrom using image processing, it is possible, on the basis of these image points and the constant focal point of the headlight, to generate updated trajectories (dynamic trajectories). By determining the offset or a rotation of an initial trajectory with respect to the corresponding dynamic trajectory, it is possible to determine an incorrect position of the headlight. One problem with this calibration method, however, is that so-called blind incorrect positions of the headlight may exist that do not bring about any offset of the two trajectories with respect to one another. In such cases, there is then no possibility of determining the incorrect position from the offset of the trajectories, since this does not constitute an unambiguous measure or does not correlate with the incorrect position.

SUMMARY

In an embodiment, the present invention provides a method for calibrating an electromagnetic radiation-emitting device configured to emit electromagnetic radiation using a sensor configured to detect electromagnetic radiation emitted by the electromagnetic radiation-emitting device. The method includes projecting a pattern onto a projection surface by way of the emitted electromagnetic radiation, acquiring an image of the projection of the pattern using the sensor, and calculating at least one trajectory in an image plane of the sensor that describes a propagation of the emitted electromagnetic radiation based on a position of a characteristic feature of the pattern in the image and on a further item of information. The further item of information contains either (i) a position of a corresponding characteristic feature of the pattern that is projected at another distance between the electromagnetic radiation-emitting device and the projection surface or (ii) a geometric model on which emission of the electromagnetic radiation is based. The method further includes calculating a specific feature along an associated trajectory, the specific feature corresponding to a characteristic feature of the pattern in the limiting case of a distance assumed to be infinite between the projection surface and the device, and calculating an incorrect position of the device by evaluating a geometric correspondence relationship between points in a world coordinate system and their image points in the image plane of the sensor for the at least one specific feature in the limiting case of a distance assumed to be infinite between the projection surface and the device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
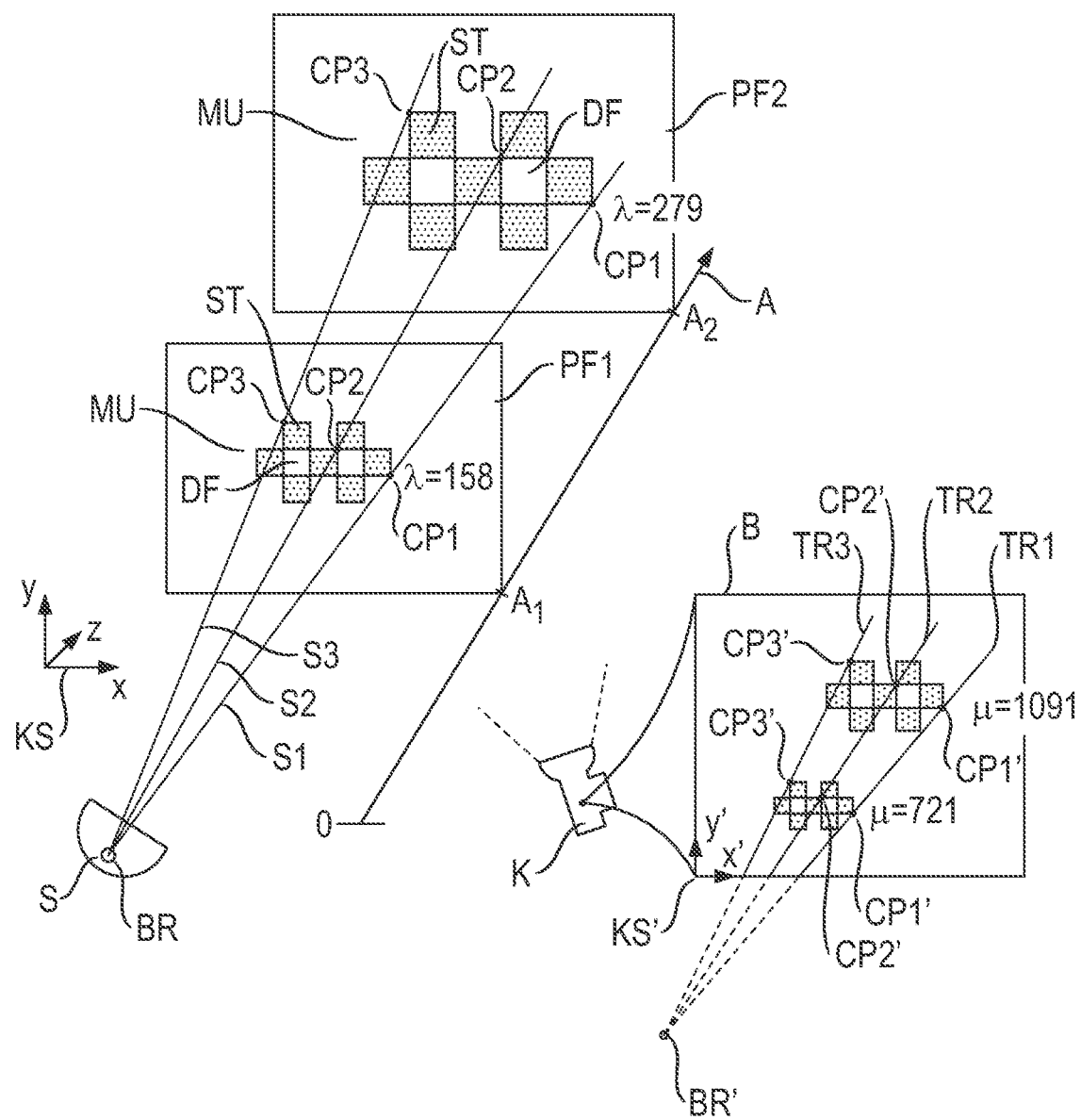
FIG. 1 shows a diagram that illustrates a geometric correspondence relationship between points in the world coordinate system and the imaging thereof in an image plane of a sensor unit.

The invention provides a number of different embodiments of a calibration method that is improved overall, that operates reliably, and that is able to be used, for example, to calibrate a headlight of a vehicle.

The method according to the invention relates to calibration on the basis of what are called "vanishing points", which are referred to hereinafter as specific points. The specific points correspond to characteristic points of a pattern projected onto a projection surface in the image plane of the sensor unit for the limiting case of an infinite distance between the emitting device or the sensor unit and the projection surface. The specific points may be calculated on the basis of trajectories that are calculated on the basis of characteristic points in an image of the scene (vehicle surroundings) as is acquired by the sensor unit. By solving a linear equation system, the vertical and horizontal incorrect position of the emitting device is then able to be determined from the calculated specific points. The initial calibration values are thus able to be corrected. In this case, the linear equation system to be solved describes the geometric correspondence relationship between points in the 3D world coordinate system and the imaging thereof (image points) in the 2D image plane of the sensor unit.

Calibrating an emitting device in line with the method according to the invention determines the alignment of the emitting device, for example the direction of the beams emitted by the emitting device, with respect to the sensor unit. The spectrum of the emitted electromagnetic radiation may in this case be adjusted as required, for example optimized with regard to the conditions of the surroundings (for example minimal scattering during propagation). As a result, the emitting device may be operated for example in the IR region, in the visible light region or in the UV region. In this case, the sensor unit is always configured to detect electromagnetic radiation in the spectral region emitted by the emitting device.

The emitting device may be a system that is intended to be calibrated directly as such, with regard to the sensor unit, by way of the method described here. By way of example, the emitting device may be the LED matrix of a headlight, which LED matrix emits visible light. The headlight may be calibrated by way of the method according to the invention on the basis of the images of the scene that are delivered by the vehicle camera as sensor unit. The method proposed here is then based on feature detection, for example edge detection and/or point detection, in a projection of a pattern in the visible light spectrum.

In a further exemplary application, the emitting device may be installed on another object and be used to calibrate this same object. The object may be calibrated using a defined/known position of the emitting device on the object to be calibrated or by a defined/known orientation of the emission characteristic of the emitting device with respect to the object to be calibrated. The object may be for example a headlight or another object that, unlike the headlight, is not able to emit directional electromagnetic beams. In the case of a headlight as object to be calibrated, the emitting device may be arranged on the headlight, for example inside the LED matrix of the headlight. The headlight is then calibrated indirectly via the calibration of the emitting device. The emitting device may in this case operate for example in the UV region, that is to say in an electromagnetic wavelength region different from the headlight, which normally operates in the visible light region.

The method according to the invention for calibrating an emitting device using a sensor unit, which is designed to detect the emitted electromagnetic radiation, in a first step, involves projecting a pattern onto a projection surface by emitting electromagnetic radiation using the emitting device. The pattern that is produced may have a form that corresponds to the form of the electromagnetic radiation-emitting segments of the emitting device. As an alternative, the pattern may be produced by emission optics positioned downstream of the segments. The emitting device may have for example a number of LEDs or LED chips that emit electromagnetic radiation in a predetermined wavelength region, for example in the IR region, in the visible light region or in the UV region.

In a further step, the method according to the invention involves acquiring the projection of the pattern using the sensor unit. The sensor unit in this case images the scene (surroundings) in front of it, in which there is also a projection surface onto which the pattern is projected. The projected pattern is imaged on the sensor surface of the sensor unit and reproduces a 2D depiction of the scene. By applying image processing to an image acquired by the sensor unit, characteristic features of the pattern, for example characteristic points or characteristic edges, are able to be detected in said image, such that their position in the image plane of the sensor unit, that is to say in the coordinate system of the sensor unit, is known. The sensor unit and the emitting device may both be installed jointly on an object, for example on a vehicle.

In a further step, the method according to the invention involves calculating at least one trajectory in the image plane of the sensor unit that describes the propagation of the radiation emitted by the radiation device. The calculation is performed on the basis of the position of (at least) one characteristic feature in the image of the projected pattern and on the basis of a further item of information that contains either the position of a corresponding or identical characteristic feature of the pattern that is projected at another distance between the device and the projection surface or a geometric model on which the emission of the electromagnetic radiation is based. At least one characteristic feature, for example an edge or a characteristic point, such as for instance a corner, is thus detected in a currently recorded image of the pattern projection and used to calculate the at least one trajectory. Since, as is known, at least two points are necessary to define a straight line, a further item of information in the form of at least one further point is necessary. The further necessary point may be obtained, on the one hand, by detecting the corresponding or identical characteristic feature in the projected pattern when the latter is produced at another distance between the emitting device and the projection surface. In particular, the further item of information may contain a focal point of the emitting device, which focal point corresponds to the intersection of the beams, which may possibly be extended rearward, emanating from the emitting device. The focal point may be considered to be an advantageous further geometrical item of information, since it remains unchanged during rotations of the emitting device in its coordinate system. The at least one trajectory may then be determined in a particularly simple manner by interpolating a straight line through the focal point and the detected characteristic point. On the other hand, further points may be obtained in order to reconstruct the at least one trajectory from the geometric model describing the emitting device, for example from the CAD model of the emitting device.

In a further step, the method according to the invention involves calculating at least one specific feature, for example a specific point, along the associated trajectory, which specific feature corresponds to characteristic features of the pattern, for example to characteristic points of the pattern, in the limiting case of a distance assumed to be infinite between the projection surface and the emitting device. This limiting case at the same time corresponds to the limiting case of a distance assumed to be infinite between the projection surface and the sensor unit. The specific features thus correspond to characteristic features in the limiting case of an infinite distance between projection surface and emitting device or vehicle camera. Various methods may be used to calculate the specific points. According to one method, use may be made of the fact that, in the case of an incorrect position of the emitting device being present, its emission characteristic is changed but not the width of the electromagnetic radiation-emitting segments of the emitting device (LEDs in the case of a matrix LED headlight). This approach is explained in detail later on.

In a further step, the method according to the invention involves calculating an incorrect position of the emitting device by evaluating the geometric correspondence relationship between points in the world coordinate system and the image points or imaging thereof in the image plane of the sensor unit for the at least one specific feature in the limiting case of a distance assumed to be infinite between the projection surface and the device. In other words, the incorrect alignment of the emitting device may thus be determined in relation to the alignment known from the initial calibration. For this purpose, a linear equation system derived from the geometric correspondence relationship is solved, which linear equation system is infinitely simplified by limit value consideration in terms of distance (between projection surface and emitting device). The geometric correspondence relationship describes the imaging rule according to which a point in the 3D world coordinate system is linked to the corresponding image point in the 2D image coordinate system that corresponds to the image plane of the sensor unit.

According to further embodiments of the method, calculating an incorrect position of the device may involve calculating a corrective rotation to the at least one previously assumed trajectory, which corrective rotation results from solving the geometric correspondence relationship in the case of imaging of the specific feature associated with the trajectory under consideration. The previously assumed trajectory may be a trajectory that was determined on the basis of the initial or of a previous calibration of the emitting device or from CAD data. The incorrect position may be described by two angles of rotation (about a horizontal and about a vertical axis, respectively) of the emitting device in relation to its position assumed in line with the initial calibration.

According to further embodiments of the method, the at least one trajectory may in each case be calculated by interpolating at least two points associated with the trajectory, characterized in that a first point corresponds to a characteristic point on the trajectory under consideration in the acquired image of the projected pattern. The positions of the characteristic point that are required here may be extracted from the image of the projection of the pattern (that it is say the image of the scene including projection of the pattern) by way of suitable image processing, as is known for example from DE 2018 101 014 from the applicant.

According to further embodiments of the method, a second point, in the calculation of the trajectory, may correspond to the focal point of the electromagnetic radiation-emitting device. The focal point of the electromagnetic radiation corresponds to the intersection of the radiation emanating from the emitting device and may be assumed to be constant by way of simplification.

According to further embodiments of the method, the specific features may correspond to specific points and in each case be characterized by a singularity in the functional description of a parameter $\lambda$ in a manner dependent on a parameter $\mu$. The parameter $\lambda$ indicates the position of a point on a beam emanating from the emitting device in world coordinates, and the parameter $\mu$ indicates the position of the corresponding image point in the image plane of the sensor unit, which image point lies on the corresponding trajectory. The point on the beam is correlated with its image point in the image plane using the geometric correspondence relationship. The singularity reflects the fact that, in the case of very large distances or in the limit value consideration of an infinite distance between projection surface and sensor unit (and at the same time emitting device), the image point of a point, moving on the beam, in the image plane of the sensor unit is stationary.

According to further embodiments of the method, the calculated specific points may correspond to characteristic points on their respective trajectories that have a distance between one another that corresponds to the distance between the origins of the beams associated with the trajectories and emanating from the emitting device. The characteristic points that are investigated may be in particular corners of fields of the projected pattern, characterized in that each of the fields is produced by an electromagnetic radiation-emitting segment of the emitting device. The distance between the characteristic points on their respective trajectories may be understood to mean a horizontal distance that runs parallel to the width of the imaging sensor of the sensor unit. The specific points may then be detected by looking for a horizontal (level) connecting line between two adjacent trajectories, whose length corresponds to the distance between the origins of the beams corresponding to the trajectories under consideration and that are emanating from the emitting unit. Such an approach is possible in both a vertical and a horizontal configuration.

According to further embodiments of the method, the electromagnetic radiation-emitting device may be arranged inside a headlight of a vehicle (for example of a motor vehicle) and be calibrated using a sensor unit installed in the vehicle, such that the method serves to calibrate the headlight of the vehicle with respect to the vehicle camera. As already explained, the emitting device may correspond to the headlight itself, for example to a matrix LED headlight, and accordingly comprise at least one light-emitting segment (also referred to as a pixel) of a matrix LED headlight, such that the calibration is performed directly with regard to the light-emitting segments of the matrix LED headlight. On the other hand, the emitting device may comprise at least one unit emitting electromagnetic waves different from the pixels of the headlight and able to operate in another spectral region. In this case, the calibration of the headlight is performed indirectly, namely by calibrating the emitting device, whose position/arrangement on the headlight is known and is accordingly able to be recalculated.

According to further embodiments of the method, the pattern, projected by way of the headlight of the vehicle and acquired by way of a driver assistance camera of the vehicle, may preferably contain a checkerboard pattern. A checkerboard pattern is understood to mean a pattern that has bright and dark fields, characterized in that the bright fields are produced by at least one pixel of the headlight, preferably by exactly one pixel. The checkerboard pattern is particularly suitable as it is able to reflect the native arrangement of the pixels inside a matrix LED headlight and is additionally well-suited to pattern recognition by way of image processing that detects corners and/or edges. It is also possible, however, to use other projected light patterns that have characteristic structures that are able to be detected well (for example overlapping/intersecting rings or squares). The use of the light patterns discussed here may of course also be produced using an emitting device that does not correspond to segments of the headlight and is able to operate in a spectral region different from light. In other words, the type of pattern that is used does not depend on the spectral region of the radiation emitted by the emitting device.

According to further embodiments of the method, the characteristic points of the projected pattern may correspond to corners of fields (which are filled with light in the case of a headlight) of the checkerboard pattern, which fields are irradiated by way of the emitting device.

The invention additionally provides a number of different embodiments of a vehicle that has an electromagnetic radiation-emitting device that is preferably installed on a headlight of the vehicle; a sensor unit that is designed to detect the emitted electromagnetic radiation; and a control unit that is coupled to the emitting device and the sensor unit and is designed to perform the calibration method described here. The control unit may drive the emitting device so as to produce a projected pattern. At the same time, the control unit may drive the sensor unit so as to record an image of the scene that contains the pattern projection. The control unit can furthermore be designed to apply image processing in order to detect the characteristic points in the acquired image of the scene and to calculate the specific points.

Before the method according to the invention is described in detail with reference to one exemplary embodiment of direct calibration of a headlight of a vehicle using the vehicle camera, its general form will first of all be summarized. As already explained, the method according to the invention is based on dynamic calibration (online calibration, that is to say calibration able to be performed during operation of the vehicle) on the basis of the specific features, for example specific points. A so-called $\lambda$-$\mu$-relationship is present as a result of the initially performed calibration. Here, $\lambda$ describes the propagation parameter of a straight line in the 3D world coordinate system (whose origin may be selected arbitrarily and may lie centered on the rear axle of the vehicle, for example), that is to say the position of a point in space on this straight line, characterized in that $\lambda$ describes the distance, along the direction vector, of the straight line from the receptor point (base) of the straight line. Accordingly, $\mu$ describes the propagation parameter in the image coordinate system and thus the distance of the image point along the corresponding trajectory from its receptor point in the 2D image plane. The $\lambda$-$\mu$-relationship may be used to describe the transformation of a 3D directional beam into the 2D image plane of the sensor unit. The directional beam in this case describes the propagation of the electromagnetic radiation from a point of the emitting device. The straight lines that describe the paths of image points (in the image plane of the sensor unit) in a manner dependent on the distance between the point in the world coordinate system and the sensor unit are also referred to as trajectories.

The correlation between the two parameters $\lambda$ and $\mu$ is not described by a linear function but rather by a hyperbola. The non-linear nature of this correlation is due to the fact that the change in the position of an image point of the pattern on its trajectory in the image plane of the sensor unit, at a uniformly increasing distance between emitter device and projection surface onto which the pattern is projected, becomes increasingly smaller. At very large distances between emitter device and projection surface, or in the limiting case of an infinite distance, when there is a variation in the position of the corresponding point on the directional beam in the 3D world coordinate system, there is no change in the position of the image point along its trajectory in the image plane of the sensor unit. On the basis of this, the singularity of the hyperbola may be sought using an infinity consideration of the $\lambda$-$\mu$-relationship. The corresponding mathematical function describing this geometric correlation may be rewritten such that the parameter $\lambda$ is described by a quotient whose numerator has the form $A+\mu*B$ and whose denominator has the form $C+\mu*B$. The terms C and D, along with statistical parameters, contain the positions of the specific points and the incorrect position of the emitting device.

In the infinity consideration, the denominator of the quotient may be set to zero (this aspect is explained in more detail below). By applying image processing to an image, acquired by the sensor unit, of the scene including the projection of the pattern, the specific points are able to be determined on the basis of their trajectories. If the specific points are known, the incorrect position of the emitting device is able to be extracted by solving a linear equation system (which hinges on the previously determined quotients as a functional expression for the parameters $\lambda$) that should have the result 0. In the case of application of direct calibration of a headlight in which at least one current trajectory is sometimes calculated on the basis of the focal point of the headlight, it is possible to assume a simplification according to which the focal point of the headlight does not change during rotations about the horizontal and vertical axis of the headlight that cause the incorrect position. In this case, the horizontal axis may correspond to an axis that runs parallel to the plane of the vehicle floor or to the horizon. The perpendicular axis is perpendicular to the horizontal axis. The current trajectories (dynamic trajectories) may preferably be determined by connecting the focal point of the emitting device, which was transformed beforehand into the 2D image plane of the sensor unit, to the characteristic image points, determined using image processing, of the light pattern. The specific points are able to be determined from the trajectories and the fact that, in the limiting consideration of an infinite distance between emitting device and projection surface, the width of the electromagnetic radiation-emitting segments of the emitting device (LEDs in the case of a matrix LED headlight) constitutes an invariable in the image of the projection of the corresponding pattern. The determined specific points are inserted into the linear equation system and the incorrect position of the emitting device is accordingly determined. On the basis of the determined incorrect position, the initial calibration data are ultimately able to be corrected and used in the context of subsequent triangulation. At the same time, the initial calibration values may thereby be checked for plausibility or verified. One essential advantageous point of the method according to the invention is that these methods do not require any CAD data or any fixed widths of the electromagnetic radiation-emitting segments of the emitting device (pixel widths in the case of matrix LED headlights). These are determined individually by the initial calibration performed beforehand, for example individually for each vehicle. Furthermore, the characteristic points may be assigned to segments of the emitting device by taking into account the specific points, such that online calibration and mapping (correspondence searching) are merged.

The method according to the invention is described below without restricting generality to the example of a headlight that is intended to be calibrated directly using a vehicle camera. A checkerboard pattern is used as an exemplary projected pattern.

FIG. 1 shows a diagram that illustrates the geometric correspondence relationship between points in the world coordinate system and the imaging thereof in the image plane of the sensor unit. The scenario shown in the figure comprises a headlight S, which projects a light pattern MU onto a projection surface arranged at a distance A therefrom, and a vehicle camera K that produces an image of the projected light pattern MU. FIG. 1 shows, in summary, a first projection surface PF1 that is arranged at a distance A1 from the headlight S, and a second projection surface PF2 that is arranged at a distance A2 from the headlight S. The projection surfaces PF1, PF2 may be any surfaces onto which the pattern MU is able to be projected, for example a garage wall. Three exemplary light beams S1, S2, S3 are also illustrated, these emanating from the headlight S and striking the projection surface. All of the light beams S1, S2, S3 run through a common focal point BR of the headlight S. The focal point BR is a geometrically constructed origin of the light beams S1, S2, S3, and not necessarily the actual origin of the beams in the real headlight S. The projected light pattern MU corresponds to a checkerboard pattern that has characteristic structures ST in the form of bright fields (these are illustrated as hatched/gray fields in FIG. 1), which are separated from one another by dark fields DF (these are illustrated as white fields in FIG. 1). The illustration of the checkerboard pattern MU corresponds here to an ideal illustration, which may have fewer corner-shaped and contrast-rich transitions between the fields in practice. Each of the light beams S1, S2, S3 under consideration produces a characteristic point of the pattern MU in the form of a corner of a characteristic structure ST, that is to say the first light beam S1 produces a first characteristic point CP1, the second light beam S2 produces a second characteristic point CP2 and the third light beam S3 produces a third characteristic point CP3.

Each light beam S1, S2, S3 may be described mathematically by a linear equation in the basic form $S=a+\lambda*d$, characterized in that a represents the receptor point vector, d the direction vector and $\lambda$ the associated real propagation parameter. The propagation parameter $\lambda$ indicates the distance of a point on the associated light beam from the receptor point of the light beam and is therefore suitable for describing the position of a point on the light beam. FIG. 1 depicts two exemplary values of the propagation parameter $\lambda$, namely $\lambda=158$ in the case of the first characteristic point CP1 on the first projection surface PF1 and $\lambda=279$ in the case of the first characteristic point CP1 on the second projection surface PF2. The scene, that is to say the light beams S1, S2, S3 and the positions of the characteristic points CP1, CP2, CP3, is described in the three-dimensional world coordinate system KS.

The scene in front of the vehicle is acquired using the vehicle camera K. An image B of the scene, depicting in particular the projection of the light pattern MU onto the current projection surface (in the present example first projection surface PF1 or second projection surface PF2) is produced on the sensor surface of the vehicle camera K. The objects depicted in the image B are described in the two-dimensional coordinate system KS' of the image plane of the vehicle camera K. Trajectories TR1, TR2, TR3 are able to be constructed from the detection of the image points CP1', CP2', CP3', corresponding to the characteristic points CP1, CP2, CP3, in the image plane B of the vehicle camera K. The first trajectory TR1, which corresponds to the image of the first light beam S1 in the image plane B, is able to be constructed from the first image point CP1' of the first characteristic point CP1 on the first projection surface PF1 and from the first image point CP1' of the first characteristic point CP1 on the second projection surface PF2. In the same way, the second trajectory TR2, which corresponds to the image of the second light beam S2 in the image plane B, is able to be constructed from the second image point CP2' of the second characteristic point CP2 on the first projection surface PF1 and from the second image point CP2' of the second characteristic point CP2 on the second projection surface PF2. The same applies with regard to the third characteristic point CP3 on the two projection surfaces PF1, PF3 and to the calculation of the third trajectory TR3 on the basis of the two third image points CP3'.

In the same way as for the illustration of the light beams S1, S2, S3 in the 3D world coordinate system KS, each trajectory TR1, TR2, TR3 may likewise be described by a two-dimensional linear equation in the image coordinate system KS' in the form $TR=a_{proj}+\mu*d_{proj}$, characterized in that $a_{proj}$ corresponds to the projected receptor point vector, $d_{proj}$ to the projected direction vector and $\mu$ to the associated real propagation parameter. In the same way as for the propagation parameter $\lambda$, the propagation parameter $\mu$ describes the distance of a point on the associated trajectory from its receptor point, and may therefore be used to describe the position of a point in the image, acquired by the vehicle camera K, of the scene. FIG. 1 depicts two exemplary values of the propagation parameter $\mu$, namely $\mu=721$ in the case of the first characteristic image point CP1', which corresponds to the first characteristic point CP1 on the first projection surface PF1, and λ=1091 in the case of the first characteristic image point CP1', which corresponds to the first characteristic point CP1 on the second projection surface PF2. In addition, the image focal point BR' may be transferred into the image plane B to the focal point BR. It is thus seen that, at each point in the 3D world coordinate system KS whose position on the associated beam is characterized by the propagation parameter λ, a corresponding image propagation parameter µ may be assigned that characterizes the position of the image point in the 2D image coordinate system KS' on the associated trajectory.

The scenario illustrated in FIG. 1 at the same time describes the basic principle according to which the initial calibration is able to be performed in order to determine the 3D beam characteristic of the segments of the headlight S. The focal point BR may also be determined at the same time. To this end, the vehicle may be successively positioned in front of a projection surface PF1, PF2 that is in each case situated at another distance A from the vehicle (that is to say also from the headlight S). The scenario shown in FIG. 1 involves two different distances A1, A2, but more distances may of course be taken into consideration. By way of example, the initial calibration may be performed at four different distances, for instance 5 m, 10 m, 15 m and 25 m. The pattern MU is projected at each of the set distances A, and the characteristic points CP1', CP2', CP3' are detected in each image B of the projection of the pattern MU, which characteristic points preferably correspond to corners of the light field ST of the pattern MU. The same characteristic points CP1', CP2', CP3' of all of the evaluated projections of the light pattern MU give 3D sets of points from which the associated trajectories TR1, TR2, TR3 are able to be formed by linear modeling (for example linear regression in the 3D space). These may ultimately be transformed from the image coordinate system KS' into the 3D world coordinate system KS, and then give the corresponding beams S1, S2, S3. After initial calibration has been performed, the linear equations of the beams S1, S2, S3 are then known, that is to say their receptor points and direction vectors. As a common receptor point for all of the beams S1, S2, S3, their focal point BR may preferably be used. The initial calibration yields good results, but it is not able to be guaranteed that the geometry, on which they are based, of the stereo system consisting of headlight S and vehicle camera K remains unchanged over the operating time of the vehicle. It is at this point that the present method steps in and provides an online calibration that allows verification or recalibration of the stereo system.

The starting point of the method according to the invention is formed by the projection equation or the geometric correspondence relationship $x_{proj}=M*RT*x$ between a point in the 3D world coordinate system KS, described by the three-dimensional vector x, and the associated projected point in the 2D image coordinate system KS', described by the two-dimensional vector $x_{proj}$. RT is the 3×4 matrix that, in summary, transforms the rotation R and translation T of a point x into the coordinates of the projection center of the camera K. This point is then projected by way of the 3×3 camera matrix M, which describes the intrinsic projection properties of the camera K, into the image plane B of the camera K. The matrix RT has nine entries for the rotation and three components of a translation vector t. In this abbreviated notation known from the mathematical processing of stereo calibration, the three-dimensional vector x is transformed into a four-dimensional one, characterized in that the fourth component is set equal to 1, $x=[x\ y\ z\ 1]^T$.

As is directly visible from FIG. 1, there is a clear correlation between points of the light beams S1, S2, S3, for instance the characteristic points CP1, CP2, CP3, and the corresponding image points, for instance the characteristic image points CP1', CP2', CP3' on the corresponding trajectories TR1, TR2, TR3. This correspondence is described by the so-called λ-µ-relationship. To obtain this, the points in the projection equation are replaced with sets of points of the corresponding light beams or trajectories, $$TR = a_{proj} + \mu * d_{proj} = M*RT*S = M*RT(a + \lambda*d),$$

characterized in that the equation holds true for a corresponding pair consisting of beam and trajectory. The equation describes the projective assignment between points of a light beam S1, S2, S3 in the 3D world coordinate system KS and points of an associated trajectory TR1, TR2, TR3 in the coordinate system KS' of the image plane B. Two equations I and II result from the calculation of the transformation between 3D world coordinate system KS and image coordinate system KS', each of which equations correspond to the x-component and y-component of the vector $a_{proj} + \mu*d_{proj}$ projected into the image system B:

$$a_{proj,x} + \mu \cdot d_{proj,x} = \qquad \text{I}$$
$$c_x - \frac{f_x(t_x + r11(a_x + d_x\lambda) + r12(a_y + d_y\lambda) + r13(a_z + d_z\lambda))}{t_z + r31(a_x + d_x\lambda) + r32(a_y + d_y\lambda) + r33(a_z + d_z\lambda)} -$$
$$\frac{s(t_y + r21(a_x + d_x\lambda) + r22(a_y + d_y\lambda) + r23(a_z + d_z\lambda))}{t_z + r31(a_x + d_x\lambda) + r32(a_y + d_y\lambda) + r33(a_z + d_z\lambda)}$$

$$a_{proj,y} + \mu \cdot d_{proj,y} = \qquad \text{II}$$
$$c_y - \frac{f_y(t_y + r21(a_x + d_x\lambda) + r22(a_y + d_y\lambda) + r23(a_z + d_z\lambda))}{t_z + r31(a_x + d_x\lambda) + r32(a_y + d_y\lambda) + r33(a_z + d_z\lambda)}.$$

Subtracting the first equation I from the second equation II gives:

$$(a_{proj,x} + \mu \cdot d_{proj,x}) - (a_{proj,y} + \mu \cdot d_{proj,y}) =$$
$$c_x - \frac{f_x(t_x + r11(a_x + d_x\lambda) + r12(a_y + d_y\lambda) + r13(a_z + d_z\lambda))}{t_z + r31(a_x + d_x\lambda) + r32(a_y + d_y\lambda) + r33(a_z + d_z\lambda)} -$$
$$\frac{s(t_y + r21(a_x + d_x\lambda) + r22(a_y + d_y\lambda) + r23(a_z + d_z\lambda))}{t_z + r31(a_x + d_x\lambda) + r32(a_y + d_y\lambda) + r33(a_z + d_z\lambda)} -$$
$$c_y + \frac{f_y(t_y + r21(a_x + d_x\lambda) + r22(a_y + d_y\lambda) + r23(a_z + d_z\lambda))}{t_z + r31(a_x + d_x\lambda) + r32(a_y + d_y\lambda) + r33(a_z + d_z\lambda)}.$$

By rearranging the equation with respect to the propagation parameter λ, the sought λ-µ-relationship is obtained in the form of a quotient of $\lambda = f(\lambda) = (A + \mu*B)/(C + \mu*D)$.

The parameters A, B, C, D constitute summarized terms that contain the parameters present in the above equation, said parameters being defined as follows:

$a_X, a_Y, a_Z$: Components of the receptor point vector a of a beam S1, S2, S3 in the 3D world coordinate system KS, which may preferably correspond to the focal point BR;

$d_X, d_Y, d_Z$: Components of the direction vector of a beam S1, S2, S3 in the 3D world coordinate system KS;

$a_{proj,X}, a_{proj,Y}$: Components of the receptor point vector (defined above as a projected receptor point vector) of a trajectory TR1, TR2, TR3 in the 2D image coordinate system KS', which is given by applying the projection matrix M*RT to the receptor point a of the corresponding beam S1, S2, S3;

$d_{proj,X}$, $d_{proj,Y}$: Components of the direction vector (defined above as a projected direction vector) of a trajectory TR1, TR2, TR3 in the 2D image coordinate system KS', which is given by applying the projection matrix M*RT to the direction vector d of the corresponding beam S1, S2, S3;

$c_X$, $c_Y$: Components of the main point displacement vector of the intrinsic camera matrix M in the x-direction and y-direction;

$t_X$, $t_Y$, $t_Z$: Components of the translation vector of the headlight coordinate system into the 3D world coordinate system KS, respectively camera coordinate system (comprises no rotation);

s: Pixel scaling according to the intrinsic camera matrix M;

$f_X$, $f_Y$: Focal length of the vehicle camera K in the x-direction and y-direction; and $r_{11}, \ldots, r_{33}$: Components of the original 3×3 rotation matrix.

Figure 2:
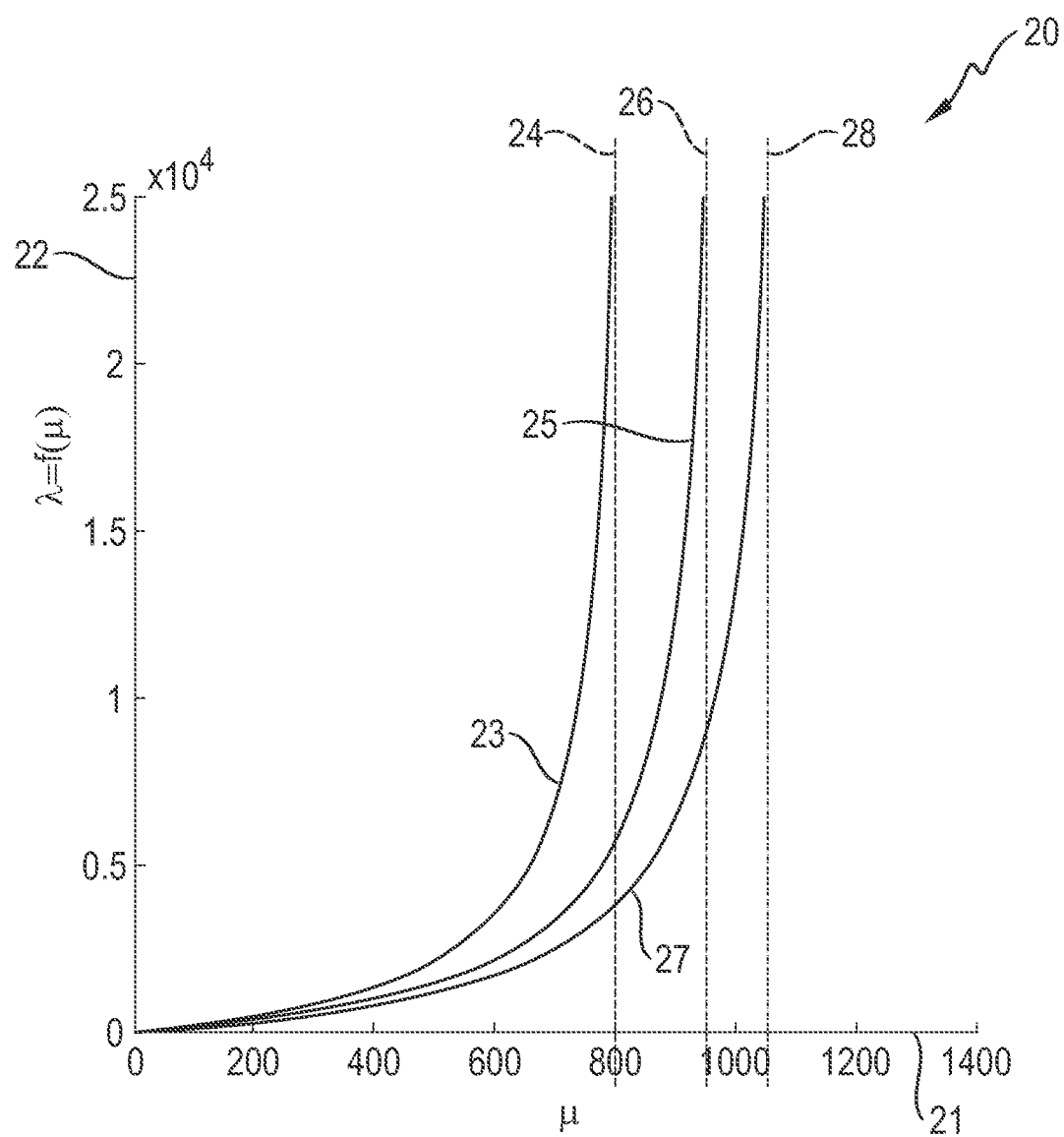
FIG. 2 shows a graph illustrating a functional relationship between points in the world coordinate system and their image points in the image plane of the sensor unit.

The functional connection between the two propagation parameters λ and μ is shown in the graph 20 in FIG. 2. The propagation parameter μ of the image plane B is plotted on the x-axis 21, and the propagation parameter λ of the 3D world coordinate system KS as a function of the propagation parameter μ is plotted on the y-axis 22, characterized in that the values on the axes reflect one singled-out exemplary scenario. Three hyperbolas 23, 25, 27 are illustrated overall, these respectively showing the functional λ-μ-relationship for another segment of the headlight or for another characteristic point of the light pattern MU. For each of the hyperbolas 23, 25, 27 there is a specific propagation parameter $μ_S$, in the case of which there is a singularity 24, 26, 28 and the values for λ accordingly tend toward infinity. The propagation parameter $μ_S$ for a respective segment or for a respective characteristic point corresponds to an asymptotic limit value for the argument of the function.

The specific points are able to be determined by determining the singularities 24, 26, 28 or by considering f(λ) at infinity. To this end, to simulate the profile of the hyperbola, the denominator of the function λ=f(λ)=(A+μ*B)/(C+μ*D) is set to zero, in which case the function values at the position of the specific propagation parameter s tend toward infinity when the numerator does not decrease. $C+μ_S*D=0$ is thus obtained, characterized in that s indicates the stationary position of an image point in the 2D image plane B with respect to a corresponding point in the 3D world coordinate system KS, which point lies at infinity or at a distance between projection surface PF and headlight S that tends toward infinity.

The λ-μ-relationship determined above may also be inverted and solved with respect to the propagation parameter μ, μ=(A−λ*C)/(λ*D−B). By forming the limit value for a propagation parameter λ tending toward infinity, which corresponds to the specific propagation parameter $μ_S$, applying l'Hospital's rule gives:

$$\mu_s = \lim_{\lambda \to \infty} \frac{A - \lambda C}{\lambda C - B} = \lim_{\lambda \to \infty} \frac{\frac{\partial}{\partial \lambda}(A - \lambda C)}{\frac{\partial}{\partial \lambda}(\lambda C - B)} = \frac{-C}{D}$$

This ultimately results in the equation $0=μ_S*D+C$, characterized in that the parameters C and D take into account the rotation of the headlight, that is to say the rotation matrix R, and the point definitions consisting of receptor point vector and direction vector in the world coordinate system KS and in the image coordinate system KS'. In this case, $C=αd_X+βd_Y+γd_Z=[α\ β\ y]^T*d$, characterized in that it is assumed that the direction vector d corresponds to a direction vector, rotated with respect to the direction vector $d_{init}$ determined in line with the initial calibration or CAD data by way of a rotation matrix $R_{correction}$, in the world coordinate system KS, characterized in that $$R_{correction} = \begin{bmatrix} \cos\theta & \sin\theta\cos\varphi & \sin\theta\cos\varphi \\ 0 & \cos\varphi & -\sin\varphi \\ -\sin\theta & \cos\theta\sin\varphi & \cos\theta\sin\varphi \end{bmatrix}.$$

Using this definition, the sought angles θ and φ are incorporated into the calculation, these being sought as correction values. In other words, a horizontal angle θ and a vertical angle φ are sought, these giving a correctional rotation to the previously assumed direction vector $d_{init}$, such that the resultant direction vector d solves the above equation, that is to say matches the specific points determined from the projected pattern.

The parameters α, β and γ, which are present in the parameter C in the equation $0=μ_S*D+C$, are defined here as follows:

$α=r_{31}*(a_{proj,x}-a_{proj,y}+c_Y-c_X)+f_X*r_{11}-f_Y*r_{21}+r_{21}*s$, $β=r_{32}*(a_{proj,x}-a_{proj,y}+c_Y-c_X)+f_X*r_{12}-f_Y*r_{22}+r_{22}*s$, $γ=r_{33}*(a_{proj,x}-a_{proj,y}+c_Y-c_X)+f_X*r_{13}-f_Y*r_{23}+r_{23}*s$.

The parameter D corresponds to $D=u*d_X+v*d_Y+w*d_Z=[u\ v\ w]^T*d$, characterized in that $u=r_{31}*(d_{proj,x}-d_{proj,y})$, $v=r_{32}*(d_{proj,x}-d_{proj,y})$ and $w=r_{33}*(d_{proj,x}-d_{proj,y})$.

If the definitions of parameters C and D are inserted into the above equation $0=μ_S*D+C$, this gives:

$0=μS*[uvw]^T*Rcorrection*d+[αβγ]^T*Rcorrection*d=$
$(μS*[uvw]^T+[αβγ]T)*Rcorrection*d$.

Using the further definition $μS*([u\ v\ w]T+[α\ β\ γ]T)=(z1\ z2\ z3)T$, the final equation results in the form of:

$0=[z1\,dXz1\,dYz1\,dZz2\,dY-z2\,dZ-z3\,dXz3\,dYz3\,dZ]T*[\cos θ \sin θ \sin φ \sin θ \cos φ \cos φ \sin φ \sin θ \cos θ \sin φ \cos θ \cos φ]$.

This equation corresponds to the product of a row vector and a column vector and needs to be solved for a determined specific point in the projected light pattern. If a total of N specific points are determined, then a total of N equations are given, characterized in that, in each of these, the first vector is defined according to the determined characteristic point. In a compact notation, the scalar zero may then be written as a vector of dimension N×1 and the N row vectors may be combined to form an N×8 matrix, characterized in that each of the rows of the matrix is each correlated with a specific point. The N×8 matrix may then be multiplied by the column vector, containing the angle values, of dimension 8×1. By solving this equation system, it is possible to determine the angles θ and φ, which rectify the incorrect position of the headlight S on the basis of the values of the initial calibration. In other words, the incorrect position is able to be extracted and used to correct the initial calibration data.

To determine specific points required for the calculation of the incorrect position of the headlight, outlined above, the characteristic points CP1', CP2', CP3' in the image plane B are first of all determined in a projection, acquired by the vehicle camera K, of the light pattern MU. The characteristic points CP1', CP2', CP3' may preferably be corners of the characteristic structures ST, as shown in FIG. 1. The characteristic points CP1', CP2', CP3' in the projection of the light pattern MU may be determined by way of corresponding image processing, for example by way of edge detection that detects the bright-dark transitions between the light-filled fields ST and the dark fields DF of the light pattern MU. The corners are then able to be detected in the silhouette of the light pattern MU that is obtained. In the case of active triangulation, in this case an algorithm based on the so-called chord-to-point distance accumulation technique may be used.

After the corners have been detected as characteristic points in the light pattern MU, the specific points have to be determined. A method suitable for this is explained with reference to the illustration shown in FIG. 3, in which the projected light pattern MU already known from FIG. 1 is shown in the form of a checkerboard. Two characteristic points CP1', CP2' detected by way of suitable image processing and the associated trajectories TR1, TR2 are shown, characterized in that other and further characteristic points may of course be used to determine the specific points. The trajectories TR1, TR2 originate in the focal point BR, transformed into the image plane B, of the headlight S. Underneath the image plane B, the headlight S is illustrated in the world coordinate system KS, from which headlight the two light beams S1, S2 emanate. In the illustration shown in FIG. 3, in the transition from the world coordinate system KS into the image plane B, that is to say into the imaging of the pattern MU, the light beams S1, S2 become trajectories TR1, TR2. A light-emitting segment (pixel) PX is illustrated in the headlight S, which segment produces the light-filled field inside the pattern MU, the corners of which are considered below. The light beams S1, S2 therefore constitute beams here by way of example, which emanate from corners of the pixel PX when considered geometrically.

As already described, the specific points constitute the endpoints of trajectories TR1, TR2 (pixel paths) at infinity. To detect these, it is not enough to detect characteristic features, for example characteristic points CP1', CP2', in the camera image B or any trajectories TR1, TR2 known from the calibration, since these either contain too little information content or moreover may be impacted by errors due to an incorrect position of the headlight S that may possibly arise. If an incorrect position of the headlight S is present that corresponds to a rotation out of its original alignment that is present at the initial calibration, the emission characteristic of the headlight S is changed but not the width of the light-emitting segments of the headlight S in the 3D world coordinate system, that it is say the width of the pixel PX. This is down to manufacture and is not able to be changed by changing the alignment of the headlight S. The width of the characteristic structure ST produced by the pixel PX at infinity in the image plane of the camera K corresponds, following recalculation, to the width of the pixel PX of the headlight S in the 3D world coordinate system. This invariant pixel width of the headlight S is utilized.

Figure 3:
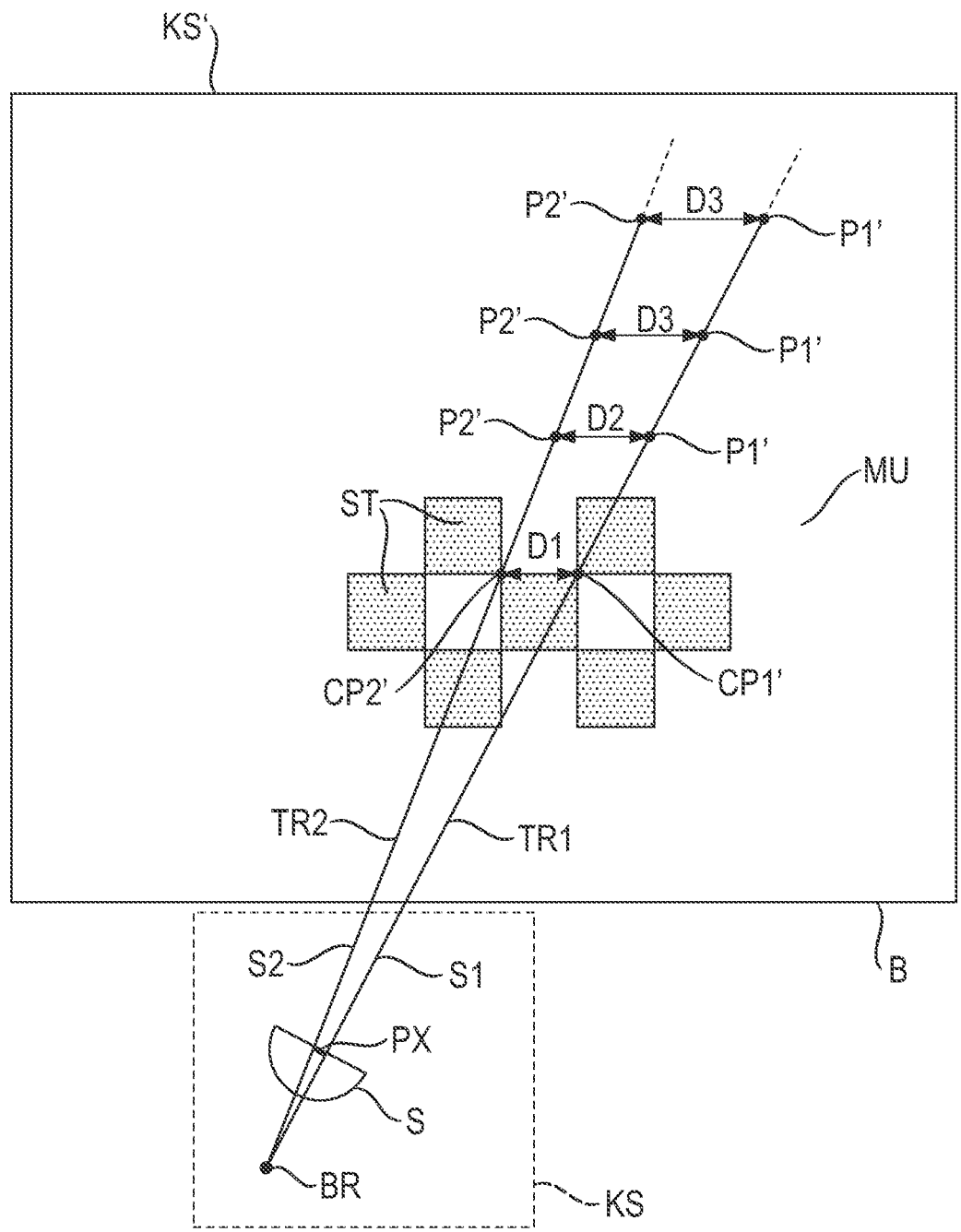
FIG. 3 shows a diagram that illustrates the determination of specific points of a projected pattern.

First of all, the trajectories TR1, TR2 are able to be generated in the image plane B of the vehicle camera K on the basis of the determined characteristic points CP1', CP2' and for example of the focal point BR, transformed into the image plane B, of the headlight S, as illustrated in FIG. 3. The two characteristic points CP1', CP2' correspond to corners of an imaging of a pixel of the headlight S and thus dimension the width D1 of the light-filled field ST. Since the specific points lie on the trajectories TR1, TR2, they may be determined by investigating distances D2, D3, D4 between points P1', P2' on the two trajectories TR1, TR2. The points P1', P2' correspond to uniformly moving characteristic points CP1', CP2' along the trajectories TR1, TR2 above, that is to say with respect to larger propagation parameters μ. The displacement occurs uniformly in that the line representing the distances D2, D3, D4 is parallel to the original distance D1 that corresponds to the distance between the characteristic points CP1', CP2' actually detected in the recording of the light pattern MU. The investigated distances D1, D2, D3, D4 normally correspond to horizontal distances in the image plane B of the vehicle camera K. If one of the widths D2, D3, D4 on the image sensor of the camera K corresponds to the width of a pixel PX of the headlight S in the 3D world coordinate system, then the associated positions of points P1', P2' on the trajectories TR1, TR2 are declared to be specific points and utilized in the equation given above in order to determine the incorrect position of the headlight S. The specific points thus constitute characteristic points CP1', CP2' that denote a characteristic structure ST in the image plane B of the vehicle camera, which characteristic structure has the dimensions of the structure of the headlight that is producing it.

Figure 4:
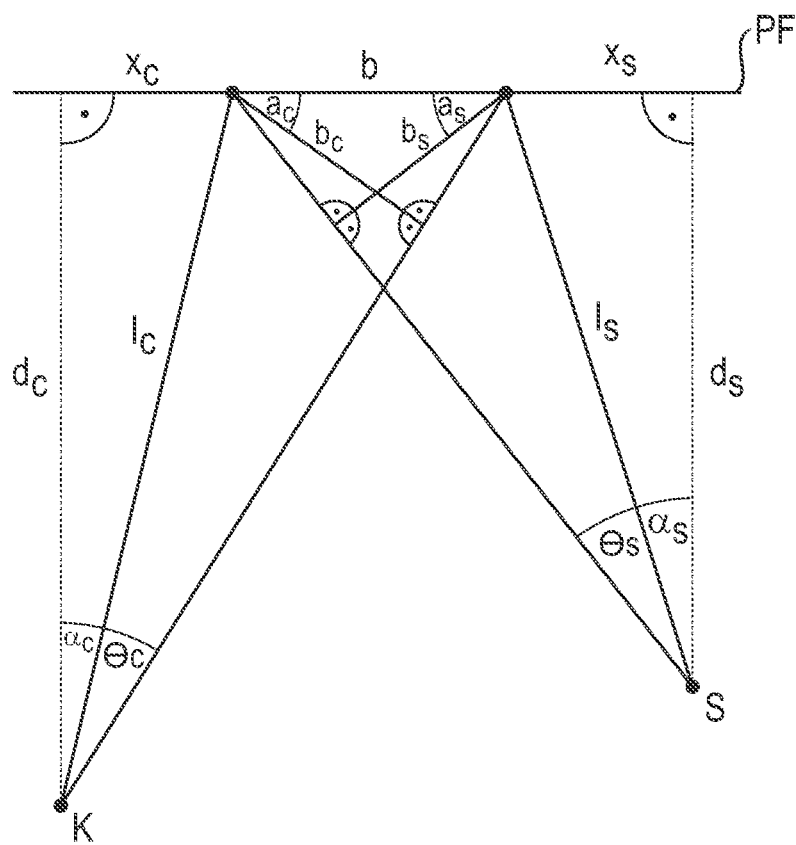
FIG. 4 shows a diagram that illustrates a geometry of the imaging of the projected pattern using the sensor unit.

FIG. 4 illustrates the geometry of the imaging of the pattern projected by the headlight S using the vehicle camera. The projection of a light field of the pattern having the width B is considered on the projection surface PF, which is situated at a distance $d_C$ from the vehicle camera or at a distance ds from the headlight S. The angle $\theta_S$ is the angle of emission of the pixel PX of the headlight S that produces the light field under consideration having the width b inside the light pattern. $\theta_C$ is the image angle that is delimited by the peripheral beams of the light field under consideration. The image angle $\theta_C$ may be calculated as follows:

$$\theta_c = 2 * \arcsin\left(\sin\left(\frac{\theta_s}{2}\right) * \frac{\sqrt{x_s^2 + d_s^2}}{\sqrt{x_c^2 + d_c^2}} * \frac{\cos\left(\arctan\left(\frac{x_c}{d_c}\right)\right)}{\cos\left(\arctan\left(\frac{x_s}{d_s}\right)\right)}\right)$$

If the formula is considered in the limiting case of infinitely large distances between projection surface PF and camera K, then the difference in position between the camera K and the headlight S becomes negligible, such that the distance between projection surface PF and the headlight S may also be set to be infinite.

Figure 5:
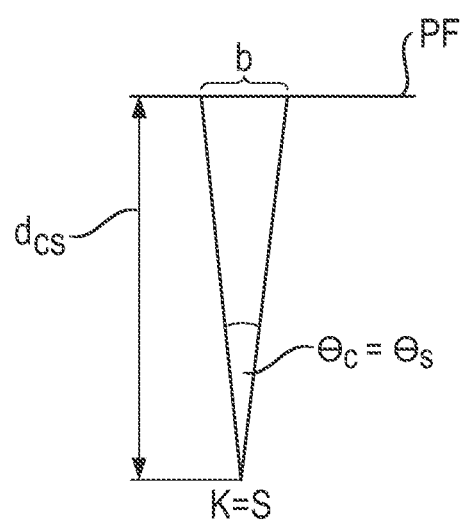
FIG. 5 shows the limiting case of the imaging geometry illustrated in FIG. 4 at very large imaging distances.

This approximation is sketched illustratively in FIG. 5. As illustrated, the position of the headlight S merges with the position of the camera K for infinitely large distances $d_{CS}$ between projection surface PF and both the headlight S and the camera K. The angle of emission $\theta_S$ therefore also corresponds to the image angle $\theta_C$ to a good approximation in this limiting case.

Since, in the limiting case of an infinite imaging distance, both the angle of emission $\theta_S$ and the image angle $\theta_C$ are very small angles, it may furthermore be roughly assumed that image angle $\theta_C$ is formed linearly from the pixel image angle $\theta_{PX}$ of the individual pixels in the image sensor of the camera K, $\theta_C = n*\theta_{PX}$. If this linear relationship is inserted into the above approximation equation for $\theta_{C,\infty}$, the number of pixels $n_{SP}$ that, in the limiting case of an infinite imaging distance, lie between two specific points of a light pattern in the image plane of the camera K, is then given as $n_{SP} = \theta_S / \theta_{PX}$. If it is assumed for example that the angle of emission $\theta_S$ of the pixel is 1.2° and the camera K has a resolution of 0.04° per pixel, then this would give $n_{SP}$=40. As a result, it would be possible to determine the specific points of a characteristic pattern, such as for example the corners, given here by way of example, of the bright fields of the checkerboard pattern, by finding characteristic points (or points P1', P2' in FIG. 3) that have a horizontal distance of 40 pixels between one another in the image plane of the camera K.

Figure 6:
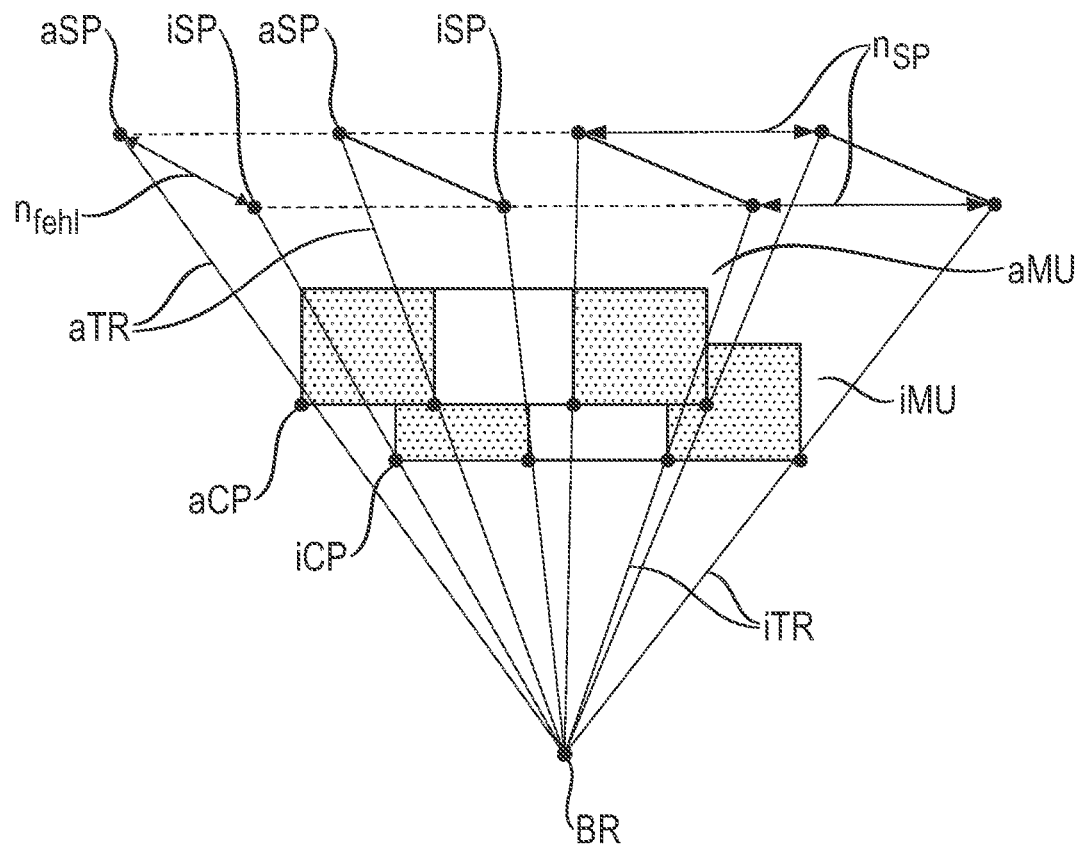
FIG. 6 shows a diagram illustrating a method for finding corrections to an existing calibration or for recalibrating the stereo system consisting of headlight and camera.

FIG. 6 shows the method for finding corrections to an existing calibration or for recalibrating the stereo system consisting of headlight and camera (the camera not being illustrated in FIG. 6). A current pattern aMU is first of all produced by way of a headlight, the current pattern aMU shown in FIG. 6 being greatly simplified and containing only three tiles of a checkerboard. In a next step, current trajectories aTR (which correspond to defined dynamic trajectories) are generated on the basis of the current characteristic points aCP detected in the current pattern aMU and for example on the basis of the focal point BR of the headlight. The current specific points aSP are then calculated on the basis of the detected current characteristic points aCP and the specific pixel distance $n_{SP}$, for example as explained with reference to FIG. 3. The specific pixel distance $n_{SP}$ corresponds to the actual (component) width of the pixel of the headlight that produces the characteristic structure in respect of which the characteristic points were detected. Finally, the pixel distance $n_{error}$ between the current specific points aSP and corresponding specific points iSP of the pattern is determined, which points were determined on the basis of an analogous evaluation of an initially evaluated corresponding light pattern iMU and the initial trajectories iTR determined therefrom. The incorrect position of the headlight is able to be derived from the pixel distance $n_{error}$ from the current specific points aSP to initially determined specific points iSP, and recalibration may be performed on the basis thereof. Since the pixel width of the headlight (or generally speaking a structural width of the emitting device) constitutes a component-induced constant, the pixel distance of the current specific points aSP between one another and of the initially determined specific points iSP between one another is the same and corresponds to the specific pixel distance $n_{SP}$. The terms initially and currently used here serve to reference the temporal difference between the source data (light patterns, trajectories, characteristic and specific features) for the determination of the specific points. Initial source data may have been determined for example in the context of the initial calibration that took place or from CAD data of the headlight. Current source data originate from recording and evaluation of the pattern that is currently being performed. By comparing results obtained from initial source data with results that have been obtained from current source data, it is possible to draw a conclusion with regard to the incorrect position of the headlight.

The incorrect position angle of the headlight is able to be determined using the method steps described herein. The initially determined emission characteristic about the vertical and horizontal (with respect to the vehicle) incorrect position angle is able to be corrected using this incorrect position angle. As a result of this, correction of the calibration data is guaranteed, so as to obtain correct results from functions in the vehicle that are based on the stereo system, such as for example trajectory-based triangulation or trajectory-based feature assignment, but also the applied midpoint method. The model of the emission characteristic of the headlight may be corrected by corresponding rotation of the straight lines that represent the light beams S1, S2, S3, according to the incorrect position angle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for calibrating an electromagnetic radiation-emitting device configured to emit electromagnetic radiation using a sensor configured to detect electromagnetic radiation emitted by the electromagnetic radiation-emitting device, the method comprising:
    projecting a pattern onto a projection surface by way of the emitted electromagnetic radiation;
    acquiring an image of the projection of the pattern using the sensor;
    calculating at least one trajectory in an image plane of the sensor that describes a propagation of the emitted electromagnetic radiation based on a position of a characteristic feature of the pattern in the image and on a further item of information that contains either (i) a position of a corresponding characteristic feature of the pattern that is projected at another distance between the electromagnetic radiation-emitting device and the projection surface or (ii) a geometric model on which emission of the electromagnetic radiation is based;
    calculating a specific feature along an associated trajectory, the specific feature corresponding to a characteristic feature of the pattern in the limiting case of a distance assumed to be infinite between the projection surface and the device; and
    calculating an incorrect position of the device by evaluating a geometric correspondence relationship between points in a world coordinate system and their image points in the image plane of the sensor for the at least one specific feature in the limiting case of a distance assumed to be infinite between the projection surface and the device.

2. The method as claimed in claim 1, wherein calculating an incorrect position of the device includes calculating a corrective rotation to at least one previously assumed trajectory, which corrective rotation results from solving the geometric correspondence relationship in the case of imaging of the specific feature associated with the trajectory under consideration.

3. The method as claimed in claim 1, wherein the at least one trajectory is in each case calculated by interpolating at least two points associated with the trajectory, wherein a first point corresponds to a characteristic point on the respective trajectory in the acquired image of the projected pattern.

4. The method as claimed in claim 3, wherein a second point corresponds to a focal point of the radiation from the electromagnetic radiation-emitting device.

5. The method as claimed in claim 1, wherein the specific features correspond to specific points and are in each case characterized by a singularity in a functional description of a parameter $\lambda$ in a manner dependent on a parameter $\mu$, wherein the parameter $\lambda$ indicates the position of a point on a beam in world coordinates, and the parameter $\mu$ indicates the position of the corresponding image point in the image plane of the sensor unit, which image point lies on the corresponding trajectory.

6. The method as claimed in claim 1, wherein the calculated specific points correspond to characteristic points on the calculated trajectories that have a distance between one another that corresponds to a distance between origins of beams associated with the trajectories and emanating from the electromagnetic radiation-emitting device.

7. The method as claimed in claim 1, wherein the electromagnetic radiation-emitting device is arranged inside a headlight of a vehicle and is calibrated using a sensor installed in the vehicle, such that the method serves to calibrate the headlight of the vehicle with respect to a vehicle camera.

8. The method as claimed in claim 7, wherein the electromagnetic radiation-emitting device comprises at least one light-emitting segment of a matrix LED headlight, wherein the projected pattern is acquired using a driver assistance camera of the vehicle, and wherein the projected pattern contains a checkerboard pattern.

9. The method as claimed in claim 8, wherein characteristic points of the projected pattern correspond to corners of light-filled fields of the checkerboard pattern.

10. A vehicle, comprising:

an electromagnetic radiation-emitting device installed on a headlight of the vehicle and configured to project a pattern onto a projection surface by way of emitted electromagnetic radiation;

a sensor configured to detect the emitted electromagnetic radiation; and a control unit coupled to the electromagnetic radiation-emitting device and the sensor, the control unit being configured to perform a method comprising:

calculating at least one trajectory in an image plane of the sensor that describes a propagation of the emitted electromagnetic radiation based on a position of a characteristic feature of the pattern in an image of the projection of the pattern captured by the sensor and on a further item of information that contains either (i) a position of a corresponding characteristic feature of the pattern that is projected at another distance between the electromagnetic radiation-emitting device and the projection surface or (ii) a geometric model on which the emission of the electromagnetic radiation is based;

calculating at least one specific feature along an associated trajectory, which specific feature corresponding to a characteristic feature of the pattern in the limiting case of a distance assumed to be infinite between the projection surface and the device; and calculating an incorrect position of the device by evaluating a geometric correspondence relationship between points in a world coordinate system and their image points in the image plane of the sensor for the at least one specific feature in the limiting case of a distance assumed to be infinite between the projection surface and the device.

* * * * *